(12) United States Patent
Mao et al.

(10) Patent No.: US 9,078,085 B2
(45) Date of Patent: Jul. 7, 2015

(54) SYSTEM AND METHOD FOR LOCAL OPERATIONS IN A COMMUNICATIONS SYSTEM

(75) Inventors: Ronald Xuzhuang Mao, San Diego, CA (US); Vibhor Julka, San Diego, CA (US); Limei Wang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 218 days.

(21) Appl. No.: 13/280,899

(22) Filed: Oct. 25, 2011

(65) Prior Publication Data

US 2012/0102222 A1   Apr. 26, 2012

Related U.S. Application Data

(60) Provisional application No. 61/406,461, filed on Oct. 25, 2010.

(51) Int. Cl.
*G06F 15/173* (2006.01)
*H04W 4/00* (2009.01)
*H04L 29/08* (2006.01)

(52) U.S. Cl.
CPC ......... *H04W 4/005* (2013.01); *H04L 29/08072* (2013.01)

(58) Field of Classification Search
None
See application file for complete search history.

(56) References Cited

U.S. PATENT DOCUMENTS

| | | | |
|---|---|---|---|
| 6,434,618 B1* | 8/2002 | Cohen et al. | 709/228 |
| 8,018,854 B1* | 9/2011 | Curtis | 370/241 |
| 2003/0223418 A1* | 12/2003 | Desai et al. | 370/389 |
| 2007/0169107 A1* | 7/2007 | Huttunen | 717/174 |
| 2008/0192740 A1* | 8/2008 | Lorusso et al. | 370/389 |
| 2008/0270622 A1* | 10/2008 | Gupta et al. | 709/231 |
| 2010/0142538 A1* | 6/2010 | Glover et al. | 370/400 |
| 2010/0257228 A1* | 10/2010 | Staggs et al. | 709/203 |
| 2011/0271007 A1* | 11/2011 | Wang et al. | 709/238 |

* cited by examiner

*Primary Examiner* — Lisa Lewis
*Assistant Examiner* — Maung Lwin
(74) *Attorney, Agent, or Firm* — Slater & Matsil, L.L.P.

(57) ABSTRACT

A system and method for local operations in a communications system are provided. A method for device operations includes identifying, at a communications controller of a communications system, identification information in a packet received from a machine-to-machine device, and determining if the packet is to be processed locally according to the identification information. The method further includes routing the packet to a local destination if the packet is to be processed locally, and routing the packet to a remote destination if the packet is not to be processed locally.

16 Claims, 6 Drawing Sheets

SYSTEM AND METHOD FOR LOCAL OPERATIONS IN A COMMUNICATIONS SYSTEM

This application claims the benefit of U.S. Provisional Application No. 61/406,461, filed on Oct. 25, 2010, entitled "Method and Apparatus for Supporting Local Breakout and Local Processing in Machine to Machine Applications on Wireless Networks," which application is hereby incorporated herein by reference.

TECHNICAL FIELD

The present invention relates generally to digital communications, and more particularly to a system and method for local operations in a communications system.

BACKGROUND

Generally, machine-to-machine (M2M) refers to a class of technologies that allow devices (wired, wireless, or a combination thereof) to communicate with other devices of same or similar ability. As an example, an M2M application may use a device (such as a sensor or a meter) to capture an event (for example, temperature, inventory information, and so forth) that is relayed through a communications system, which may be wired, wireless, or a combination thereof, to an application that translates the event into meaningful information. Typically, the communications from the device to the application is accomplished by having a remote network of machines relay the information to a central hub for analysis, which may then be forwarded to a system, such as a personal computer.

Modern M2M applications have expanded beyond simple one-to-one connections into a system of networks that transmit data between personal appliances, leading to systems with very large numbers of devices (potentially on the order of tens or hundreds of millions of devices). Combined with the expansion of wireless communications systems around the world, facilitating M2M communications is easier than ever, lessening the amount of time, power, and cost needed for information to be shared between machines.

However, the sheer number of devices that needs to be supported may become a burden to the wireless communications systems. Therefore, there is a need for a system and method for reducing the burden on the wireless communications systems from the large number of M2M devices and their associated communications.

SUMMARY OF THE INVENTION

These and other problems are generally solved or circumvented, and technical advantages are generally achieved, by example embodiments of the present invention which provides a system and method for local operations in a communications system.

In accordance with an example embodiment of the present invention, a method for packet processing is provided. The method includes identifying, at a communications controller of a communications system, identification information in a packet received from a machine-to-machine device, determining if the packet is to be processed locally according to the identification information, routing the packet to a local destination if the packet is to be processed locally, and routing the packet to a remote destination if the packet is not to be processed locally.

In accordance with another example embodiment of the present invention, a network entity is provided. The network entity includes a packet processing unit and a routing unit. The packet processing unit identifies identification information in a packet received from a machine-to-machine device, and determines if the packet is to be processed locally according to the identification information. The routing unit routes the packet to a local destination if the packet is to be processed locally, and routes the packet to a remote destination if the packet is not to be processed locally, where the network entity is a communications controller or a gateway router of a communications system.

In accordance with another example embodiment of the present invention, a communications system is provided. The communications system includes a machine-to-machine (M2M) device and a network entity coupled to the M2M device. The M2M device transmits a packet. The network entity identifies identification information for the packet received from the M2M device, determines if the packet is to be processed locally according to the identification information, routes the packet to a local destination if the packet is to be processed locally, and routes the packet to a remote destination if the packet is not to be processed locally. The network entity is a communications controller or a gateway router of the communications system.

One advantage of example embodiments is that M2M traffic may be processed locally to help reduce overall communications system traffic, which may negatively impact communications system performance.

A further advantage of example embodiments is that the local processing of the M2M traffic does not require a significant investment in hardware and/or software. Therefore, the example embodiments may be implemented without significant cost or time investments.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to locally processing and/or locally routing (or equivalently, locally switching) M2M traffic to help reduce M2M traffic traversing a communications system, which may needlessly burden the communications system. For example, at either a base station or a gateway router, a subset of M2M traffic is locally processed and/or locally routed rather than routed to a remote processor for processing or to a remote destination. Local processing and/or local routing of the M2M traffic reduces a total amount of traffic in the communications system, which helps to improve overall communications system performance.

The present invention will be described with respect to example embodiments in a specific context, namely a communications system that supports wired or wireless connections with devices, wherein some of the devices are M2M devices.

Figure 1:
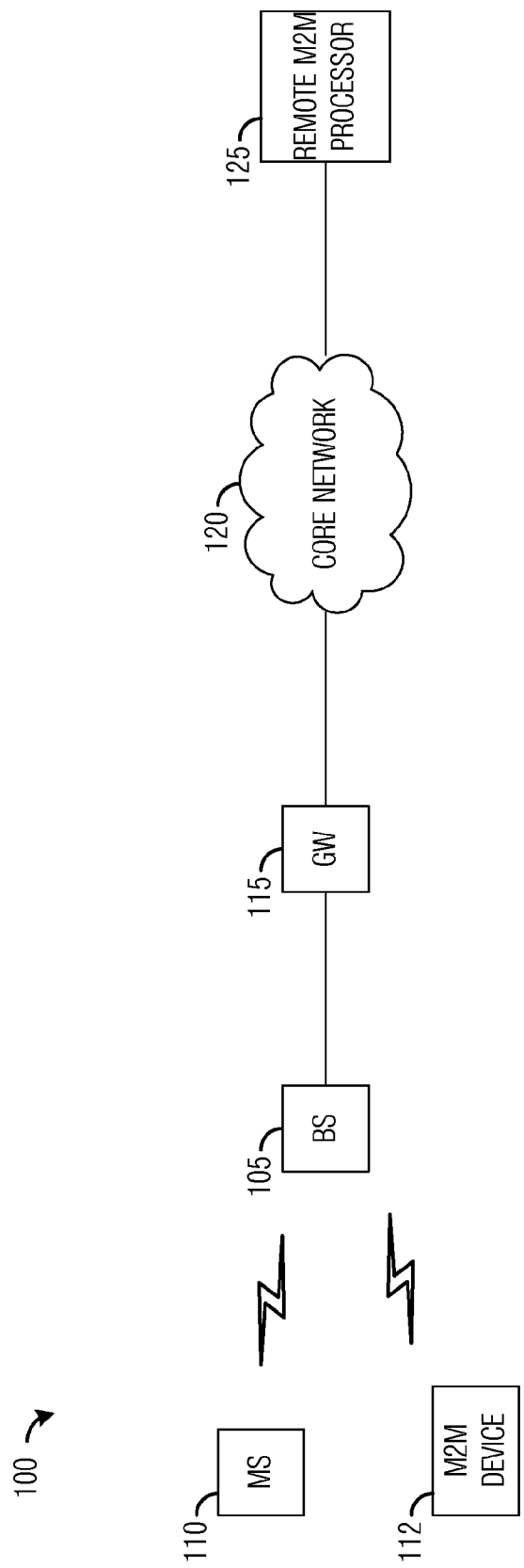
FIG. 1 illustrates an example communications system according to example embodiments described herein.

FIG. 1 illustrates a communications system 100. Communications system 100 includes a base station (BS) 105 that serves a number of communications devices, such as a mobile station (MS) 110 and a M2M device 112. Although shown in FIG. 1 as a base station, which is generally a full power communications controller, communications system 100 may include other types of communications controllers, such as low power cells (LPC) including femto cells, pico cells, relay nodes, and so on.

MS 110 may be any of a variety of communications devices intended to connect a user of MS 110 to a service, such as voice service, data service, and so forth. BS 105 may also be referred to as a communications controller, NodeB, enhanced NodeB (eNB), and so on, while MS 110 may also be referred to as a mobile, a subscriber, a user, a terminal, a User Equipment (UE), and so forth. M2M device 112 may be an implementation of a M2M only device, such as a sensor, a meter, etc. Generally, a M2M device differs from a MS in that the M2M device is not directly being used by a user.

Both MS 110 and M2M device 112 may communicate through BS 105. For example, BS 105 may allocate system resources to MS 110 and/or M2M device 112 to allow MS 110 and/or M2M device 112 to transmit or receive.

BS 105 may be coupled to a gateway (GW) 115 that serves as an entry point or an exit point for an access network comprising BS 105. Transmissions exiting the access network or entering the access network including BS 105 may need to go through GW 115. GW 115 may also be referred to as an edge server, an access service network gateway (ASN-GW), or so on.

A core network 120 allows network entities from different networks to communicate. As an example, communications from M2M device 112 may be sent to a remote M2M processor 125, which may be located in an enterprise network, through core network 120.

While it is understood that communications systems may employ multiple BSs capable of communicating with a number of communications devices (e.g., MSs and/or M2M devices), only one BS, one MS, and one M2M device are illustrated for simplicity.

A transmission from M2M device 112 passes through BS 105, GW 115, core network 120 before arriving at remote M2M processor 125. In addition to generating traffic, M2M device 112 may also receive traffic. Therefore, if M2M device 112 generates and/or receives a lot of traffic or if there is a large number of M2M devices operating in communications system 100, then a large number of communications system resources may be dedicated to sending the traffic to and from remote M2M processor 125 (or other remote M2M processors in communications system 100).

However, not all traffic generated by a M2M device needs to be analyzed by a remote M2M processor. As an example, consider M2M devices in an automobile. Information generated by these M2M devices may be sent to an operator of the automobile, not necessarily to a remote M2M processor, which upon receipt, may send the information to the operator. Sending the M2M information directly to the operator rather than the remote M2M processor may be referred to as local routing or local switching. Another example may be weather information gathered by M2M devices. Raw information may be processed by a local M2M processor (or a semi-local M2M processor) prior to being sent to a remote M2M processor, which may significantly reduce the amount of traffic traversing communications system 100. Sending the M2M information to the local M2M processor rather than the remote M2M processor where it is processed may be referred to as local processing. Therefore, locally routing, and locally processing or semi-locally processing M2M traffic rather than automatically sending M2M traffic to a remote M2M processor may help to significantly reduce the amount of traffic traversing a communications system.

Local routing or local switching may be a simple form of local processing, where an M2M packet is routed or switched to a local destination. Local routing may or may not include local processing in addition to the local routing.

Local routing of traffic may be applied to information that is relevant to a given geographic region. As an example, consider an M2M home application, such as climate control. Information generated by M2M sensors used in such an application generally does not need to be propagated to a remote M2M processor. Similarly, in a weather information application, local weather information measured by M2M sensors may be sent to users in the general area (e.g., within a neighborhood or a BS coverage range) and not propagated to a remote M2M processor.

Information aggregation may involve sending information generated by M2M sensors to a local M2M processor for aggregation prior to being sent to a remote M2M processor. Referring back to the weather information application, the weather information generated by the M2M sensors may be aggregated and the aggregated information may be sent to a remote M2M processor. Therefore, rather than sending hundreds if not thousands of messages to the remote M2M processor, only a small number messages comprising the aggregated information may be sent to the remote M2M processor.

Information analysis may involve a local M2M processor at least partially analyzing the information generated by M2M sensors before sending the information to a remote M2M processor. Referring back to the weather information application, the weather information generated by the M2M sensors may analyzed for patterns, trends, and so forth, before aggregation and propagation to the remote M2M processor.

Figure 2:
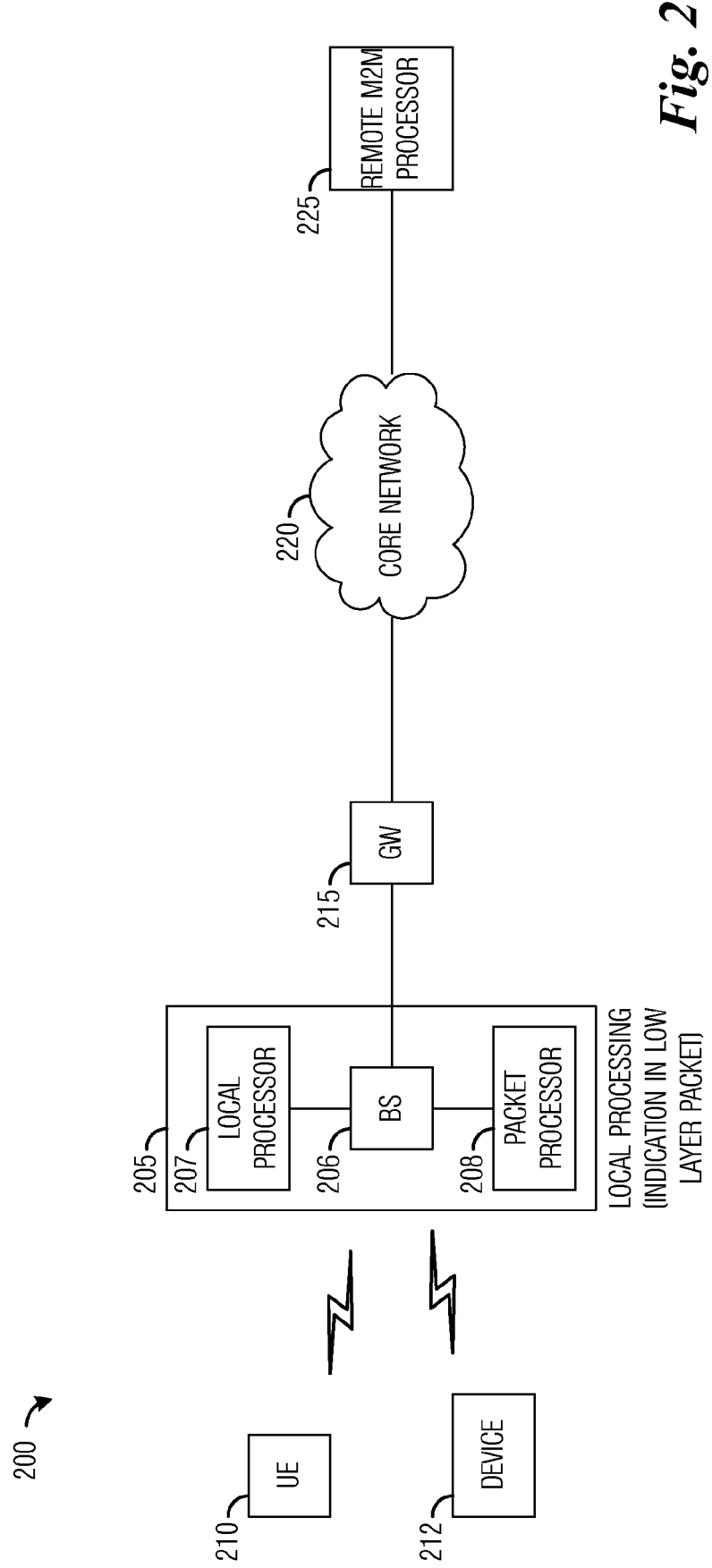
FIG. 2 illustrates an example communications system, wherein local processing of M2M traffic is provided at a BS level according to example embodiments described herein.

FIG. 2 illustrates a communications system 200, wherein local processing of M2M traffic is provided at a BS level. Communications system 200 includes an enhanced BS (eBS) 205 serving communications devices, such as a UE 210 and a M2M device 212. eBS 205 may include a BS 206 that provides typical BS functionality, such as resource allocation, scheduling, and so on, a local processor 207, that may be used in the local processing of traffic from M2M devices, and a packet processor 208, that may be used to determine if local routing or local processing is warranted for traffic from M2M devices.

Packet processor 208 may examine a M2M packet to determine if local routing or local processing is to be provided to the M2M packet. A detailed description of packet processor 208 is provided below. If the M2M packet is to be locally routed, the M2M packet may be routed to a local destination, such as a UE coupled to eBS 205, for example. If the M2M packet is to be locally processed, then the M2M packet may be routed to local processor 207, for example.

Since eBS 205 is a first network entity of communications system 200 that receives traffic from M2M device 212, eBS 205 may be a logical entity to determine if the traffic from M2M device 212 should be locally processed or propagated to a remote M2M processor 225 through a GW 215 and a core network 220.

Although shown as being co-located with BS 206 in eBS 205, local processor 207 may be implemented as a separate unit that is coupled to BS 206. Furthermore, packet processor 208 may be implemented inside BS 206. Therefore, the discussion of local processor 207 being co-located with BS 206 and/or packet processor 208 being external to BS 206 should not be construed as being limiting to either the scope or the spirit of the example embodiments.

Although shown in FIG. 2 as a full power BS, eBS 205 may be implemented as a LPC, such as a femto cell, an RN, or so forth. Therefore, the discussion of full power BSs should not be construed as being limiting to either the scope or the spirit of the example embodiments.

In general, eBS 205 may be considered to be a low level entity that operates on access technology (e.g., access technologies such as Third Generation Partnership Project (3GPP) Long Term Evolution (LTE), Code Division Multiple Access (CDMA), WiMAX, and so on) dependent packets. In other words, the packets, such as information contained therein, headers, control information, and so on, may differ depending on the access technology supported by eBS 205. Therefore, packet processor 208 for the local processing of traffic from M2M device 212 may be access technology dependent.

Figure 3:
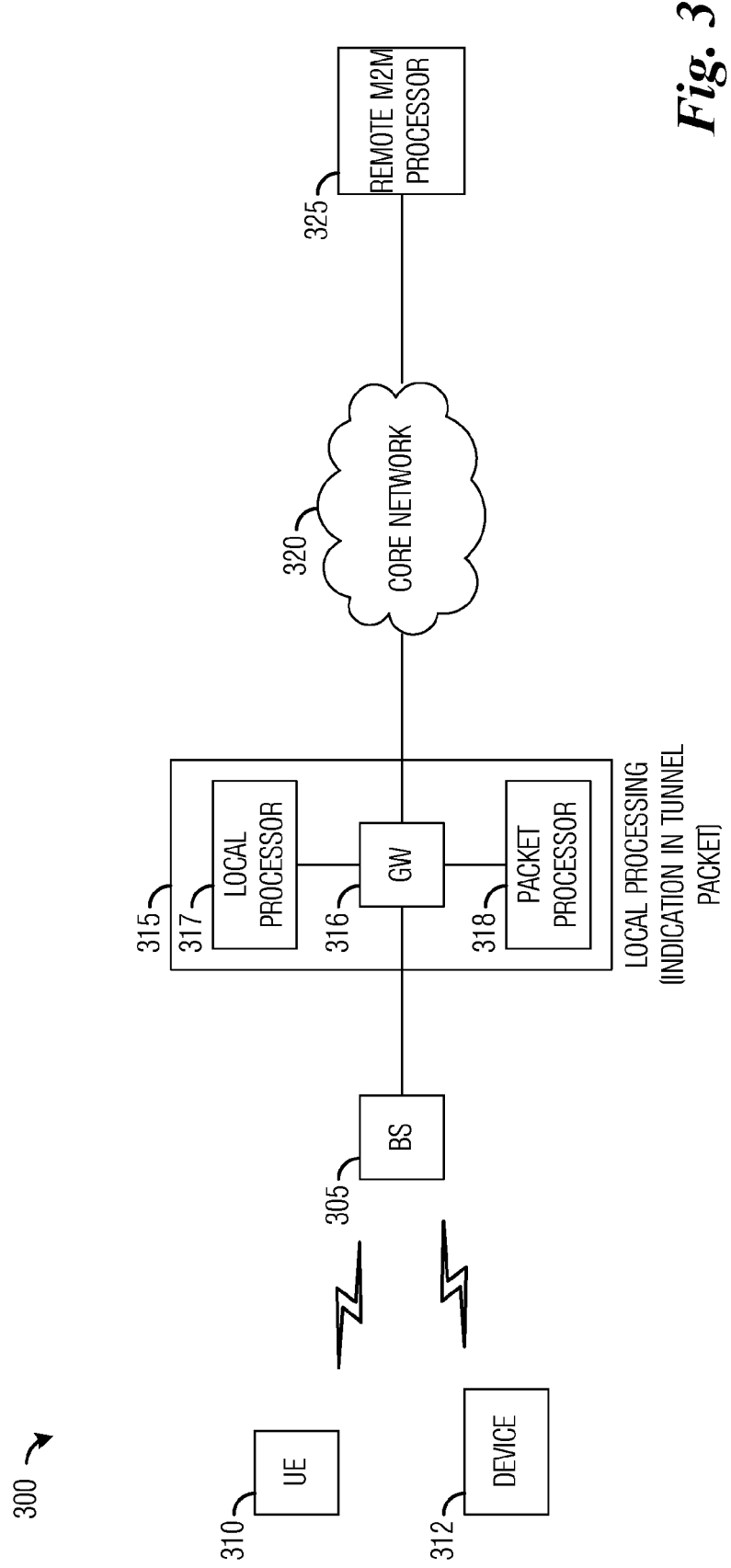
FIG. 3 illustrates an example communications system, wherein local processing of M2M traffic is provided at a GW level according to example embodiments described herein.

FIG. 3 illustrates a communications system 300, wherein local processing of M2M traffic is provided at a GW level. Communications system 300 includes a BS 305 serving communications devices, such as a UE 310 and a M2M device 312. BS 305 may send traffic from M2M device to an enhanced GW (eGW) 315. eGW 315 may include a GW that provides typical GW functionality, such as routing, address translation, and so forth, a local processor 317, that may be used in the local processing of traffic from M2M devices coupled to BSs coupled to eGW 315, and a packet processor 318, that may be used to determine if local routing or local processing is warranted for traffic from M2M devices.

Packet processor 318 may examine a M2M packet to determine if local routing or local processing is to be provided to the M2M packet. A detailed description of packet processor 318 is provided below. If the M2M packet is to be locally routed, the M2M packet may be routed to a local destination, such as a UE coupled to BS 305, for example. If the M2M packet is to be locally processed, then the M2M packet may be routed to local processor 317, for example.

Although shown as being co-located with GW 316 in eGW 315, local processor 317 may be implemented as a separate unit that is coupled to GW 316. Furthermore, packet processor 318 may be implemented inside GW 316. Therefore, the discussion of local processor 317 being co-located with GW 316 and/or packet processor 318 being external to GW 316 should not be construed as being limiting to either the scope or the spirit of the example embodiments.

Since eGW 315 typically operates on IP packets, packet processor 318 may be access technology independent. Therefore, packet processor 318 may operate properly with any access technology used by M2M devices to communicate with their respective BSs.

In order to support local processing of M2M traffic, M2M traffic may be need to be identified and then based on the identification of the M2M traffic, a determination of local destination or remote destination or local processing or remote processing may be made by a packet processor (e.g., packet processor 208 or packet processor 318). Identification information may be used to identify characteristics of the M2M traffic. As an example, the identification information may identify characteristics such as application type, source of the M2M traffic, destination of the M2M traffic, a processor of the M2M traffic, desired type of processing (e.g., local or remote) for the M2M traffic, and so forth. The identification information may already be a part of the M2M traffic or the identification may be specifically added to the M2M traffic for express purpose of local processing determination.

According to an example embodiment, the identification information for the M2M traffic may be provided by an M2M device that generates the M2M traffic. As an example, the M2M device may know that local processing is or is not desired for its M2M traffic and the M2M device may provide or adjust the identification information accordingly. The identification information may be provided automatically by the M2M device as the M2M device generates the M2M traffic or the M2M device may utilize additional processing steps to provide the identification information for the M2M traffic.

According to an example embodiment, M2M traffic (e.g., a packet) may include identification information in the form of an indicator that indicates that the packet needs or does not need local routing or local processing. If it is detected (by a packet processor, for example) that the packet includes the indicator set to a value that indicates that the packet should be locally processed, local processor 207 or local processor 317 may then process the packet, where processing the packet by local processor 207 or local processor 317 may include local information aggregation, local information analysis, and so on. While if it is detected that the packet includes the indicator set to a value that indicates that the packet should be locally routed, the packet may be routed to a local destination. If the packet processor detects that the packet includes the indicator set to a value that indicates that the packet should not be locally processed, the packet processor may allow the packet to be propagated to remote M2M processor 225 without any local routing or local processing. Alternatively, the indicator may indicate a specific destination or a specific processor, such as a local processor or a remote M2M processor, for the packet.

Deep packet inspection (DPI) may be used by the packet processor to identify a presence or absence of the indicator in M2M traffic. DPI involves the inspection of a data portion of a packet (as well as potentially a header portion of the packet) to the presence or absence of the indicator or some other identification information.

According to an example embodiment, M2M traffic may include identification information in the form of an identifier. As an example, an identifier, such as a service flow identifier (SFID), may be used to identify M2M traffic for local routing or local processing. eBS 205 or eGW 315 may assign a dedicated SFID or some other identifier to M2M traffic that is subject to local routing or local processing. Then, if eBS 205 or eGW 315 receives M2M traffic so identified with the dedicated SFID, the M2M traffic may be provided to a local destination or local processor 207 or local processor 317, for example. DPI may be used to identify a presence or absence of the dedicated SFID in M2M traffic. Alternatively, the identifier may identify a specific local destination or a specific processor, e.g., a local processor or a remote processor.

In addition to or in place of the indicator and/or an identifier to indicate whether or not M2M traffic should be locally routed or locally processed, M2M traffic may be tagged to identify traffic for local processing. As an example, additional cause codes for a media access control (MAC) layer message may be used to tag traffic for local routing or local processing. Then, a trigger may be added at the MAC layer so that eBS 205 or eGW 315 may initiate local routing or local processing for so tagged traffic. DPI may be used to identify a presence or absence of the dedicated tag in M2M traffic.

Once the M2M traffic has been identified (e.g., based on identification information, such as indicator, identifier, tag, or so on), the M2M traffic may be switched to a local destination for local routing, or a local processor (such as, local processor 207 or local processor 317) for local processing (if local processing is desired), or propagated to a remote M2M processor (if local processing is not desired). Switching functionality may be added to eBS 205 since a BS generally does not perform switching. A table, such as a look up table, may be used to store addresses to be used for switching.

Figure 4:
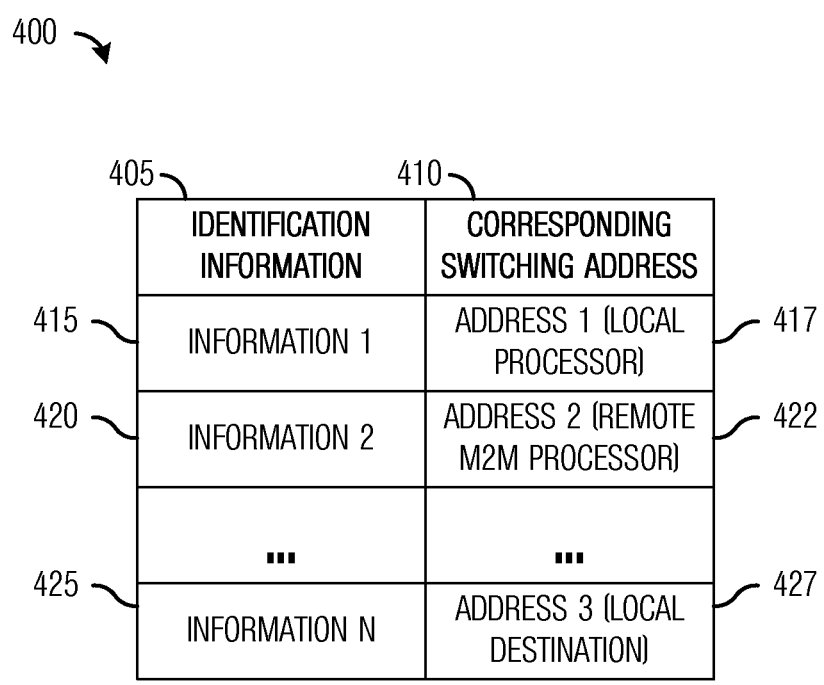
FIG. 4 illustrates an example table that may be used in determining local processing or remote processing for M2M traffic according to example embodiments described herein.

FIG. 4 illustrates a table 400 that may be used in determining local routing, local processing, or remote processing for M2M traffic. Table 400 may be arranged as a look up table, for example. A first column 405 comprises identification information, such as indicator, identifier, tag, or so on. The identification information in first column 405 may be used to index table 400. A second column 410 comprises corresponding switching addresses. As an example, a first identification information entry 415 in first column 405 comprises "information 1" which may be identification information for M2M traffic. Associated with "information 1" in first identification information entry 415 is "address 1" in a first corresponding switching address entry 417, which may be an address of a local processor intended to process M2M traffic having identification information "information 1". Similarly, a second identification information entry 420 in first column 405 comprises "information 2" which may be identification information for M2M traffic. Associated with "information 2" in second identification information entry 420 is "address 2" in a second corresponding switching address entry 422, which may be an address of a remote M2M processor intended to process M2M traffic having identification information "information 2". Furthermore, an N-th identification information entry 425 in first column 405 comprises "information N" which may be identification information for M2M traffic. Associated with "information N" in second identification information entry 425 is "address 2" in a second corresponding switching address entry 427, which may be an address of a local destination for M2M traffic having identification information "information N".

According to an example embodiment, IP address filtering may be used to determine if local processing of M2M traffic is warranted. In IP address filtering, a table, such as a look up table, may be used. The table may be indexed based on an identifier, such as an IP address, that may have a corresponding switching address that may either be an address of a local destination (if local routing is desired), a local processor (if local processing is desired), or a remote M2M processor (if local processing is not desired). For example, if M2M traffic having a first identifier is to be locally processed, then the corresponding switching address for the first identifier may be for a local processor. While if M2M traffic having a second identifier is to be propagated to a remote M2M processor, then the corresponding switching address for the second identifier may be an address of the remote M2M processor. The table may be used by built-in routing functionality in GW 316 to route M2M traffic for processing. IP address filtering may also be available at eBS 205 if DPI is used.

At eGW 315, the table may be maintained so that M2M traffic destined for an M2M application server may be routed to its corresponding local destination or local processor. The local processor may either process the M2M traffic as a proxy for the M2M application server or it may aggregate multiple M2M traffic and then forward the aggregated traffic to the M2M application server, for example.

According to an example embodiment, Layer Two (L2) tag filtering may be used to determine if local routing or local processing of M2M traffic is warranted. In L2 tag filtering, an M2M application may be made aware of an address, such as an IP address, that is to be locally processed. Traffic addressed to the address may have a L2 tag. The use of the L2 tag may allow intermediate hosts to process portions of IP headers and not perform DPI on all traffic. As an example, at eBS 205, a table, such as a look up table, may be maintained so that a MAC frame having a dedicated SFID, i.e., the L2 tag, is switched to a corresponding local destination or local processor. The local processor may either process the M2M traffic as a proxy of an M2M processor or it may aggregate multiple M2M traffic and then forward the aggregated traffic to the M2M processor.

According to an example embodiment, the local routing or local processing of M2M traffic may be based on a specified local routing or local processing policy. For example, local routing or local processing may be controlled locally. Additionally, local routing or local processing may be disabled when a local destination or a local processor is not available, and hence, M2M traffic may be propagated to a remote M2M processor. Furthermore, local routing or local processing may be disabled (thereby resulting in the M2M traffic being propagated to the remote M2M processor) when content of the M2M traffic needs to be inspected, statistics related to the M2M traffic needs to be collected, billing information for the M2M traffic needs to be generated, and so on.

Local routing or local processing policy may be applied on a variety of bases, such as application type, for example. An application type may be associated with an address, e.g., an IP address, of an M2M application server. The address may be made available to an eBS and/or an eGW (the network entity responsible for local processing) as part of local routing or local processing policy. The eBS and/or the eGW may identify the application type of M2M traffic by inspecting its address, i.e., its destination address. Then, based on the application type, the M2M traffic may be routed locally or processed locally instead of being propagated to a remote M2M processor. Other examples of possible bases for applying local routing or local processing policy may include access session, device type, and so on.

According to an example embodiment, the local routing or local processing policy may be updated dynamically. Identification information, such as an indicator, identifier, tag, or so on, of M2M traffic used to determine which M2M traffic is to be routed locally or processed locally and which will not may be provisioned statically or dynamically assigned. As an illustrative example, M2M traffic from a M2M device (such as a metering device) may normally be directed to a remote M2M processor based on identification information (such as an IP address of the remote M2M processor) associated with the M2M traffic, but in some instances, it may be directed to local processing. For example, if it is determined that the remote M2M processor is determined to be congested, faulty, or otherwise unavailable, then a table used to determine if local processing of the M2M traffic is to be performed may be modified with an address of a local processor replacing an address of the remote M2M processor. Therefore, when M2M traffic is received with an IP address of the remote M2M processor, the M2M traffic may be switched to the local processor rather than the remote M2M processor.

Similarly, in a situation wherein M2M traffic from a certain M2M sensor is typically routed to a local processor, but it is determined that the local processor is congested, faulty, or otherwise unavailable, then a table used to determine if local processing is to be performed may be modified with an address of a remote M2M processor replacing an address of the local processor. Therefore, when M2M traffic is received with an IP address of the remote M2M processor, the M2M traffic may be propagated to the remote M2M processor instead of being routed to the local processor as is normally the case.

Figure 5:
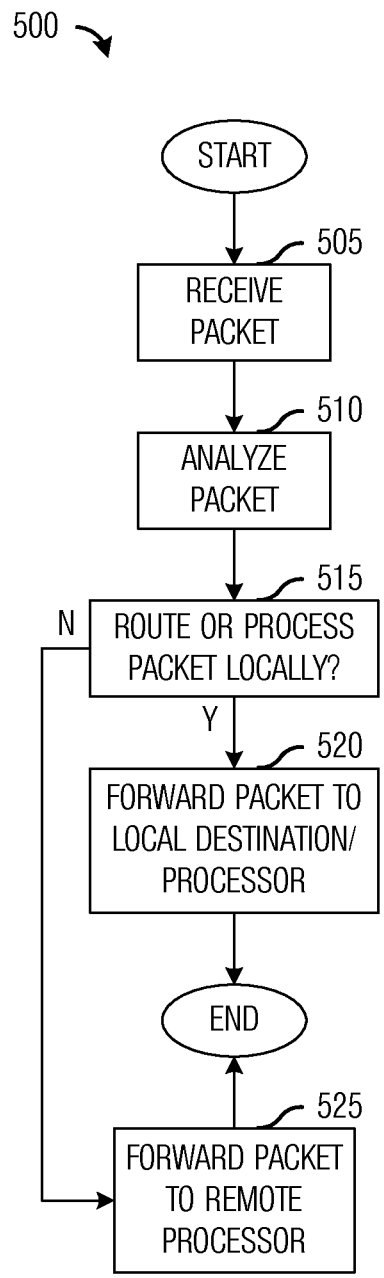
FIG. 5 illustrates an example flow diagram of operations in processing a packet according to example embodiments described herein.

FIG. 5 illustrates a flow diagram of operations 500 in processing a packet. Operations 500 may be indicative of operations occurring in a device, such as an eBS or a eGW, as the device processes the packet to determine if the packet is to be locally processed or remotely processed. Operations 500 may occur while the device is in a normal operating mode.

Operations 500 may begin with the device receiving the packet (block 505). The device may analyze the packet to determine if it is to be local routing, locally processed, or remotely processed (block 510). As discussed previously, the packet may be in the form of an access technology dependent packet (if the device is an eBS) or a generic format that is not access technology dependent (if the device is an eGW). Depending on the packet, the device may use access technology dependent techniques to analyze the packet, due to potential differences in packet structure, format, information, and so forth.

As an illustrative example, the device may use DPI to detect the presence of identification information in the packet. For example, DPI may be used to detect an indicator, identifier, tag, or so on, in the packet. The identification information may then be used to determine if the packet is to be locally processed or remotely processed.

As an alternative to DPI, the device may search the packet for the identification information. For example, the identification information may be in the form of an indicator appended to a portion of the packet, or an identifier replacing an existing identifier in the packet, or a tag added to an existing part of the packet.

With the identification information detected, the device may perform a check to determine if the packet is to be routed locally or processed locally (block 515). According to an example embodiment, a table may be used to determine if the packet is to be routed locally or processed locally. As an illustrative example, the device may make use of the identification information to search the table and retrieve information specifying whether or not the packet is to be routed locally or processed locally.

The information related to the identification information may be an indicator that indicates whether or not the packet is to be locally routed or locally processed. If the packet is to be locally routed or locally processed, then the device may forward (switch) the packet to a local destination or a local processor configured to process the packet (block 520). If the packet is not to be locally routed or locally processed, then the device may propagate the packet to a remote processor configured to process the packet (block 525). Information about the local destination, local processor, and/or the remote processor may also be included in the table.

The information related to the identification information may be in the form of an address of a local destination for the packet or a processor configured to process the packet. If the information is related to a processor for the packet, the address may be for a local processor or a remote processor. Then the device may simply switch the packet to the address, whether or not the address is that of the local processor or the remote processor.

As an illustrative example, if the device is an eBS, then the eBS may perform DPI on one or more MAC frames (i.e., the packet) to find the identification information related to the packet. According to an example embodiment, the identification information may be in the form of an identifier, such as a service flow identifier, and the eBS may reference the identifier to determine if the packet is to be routed locally, or processed locally or remotely.

As an illustrative example, if the device is an eGW, then the eGW may perform DPI on the packet to find the identification information related to the packet. According to an example embodiment, the identification information may be in the form of an address, such as an IP address, of the packet. The eBS may reference the address to determine if the packet is to be routed locally, or processed locally or remotely.

Figure 6:
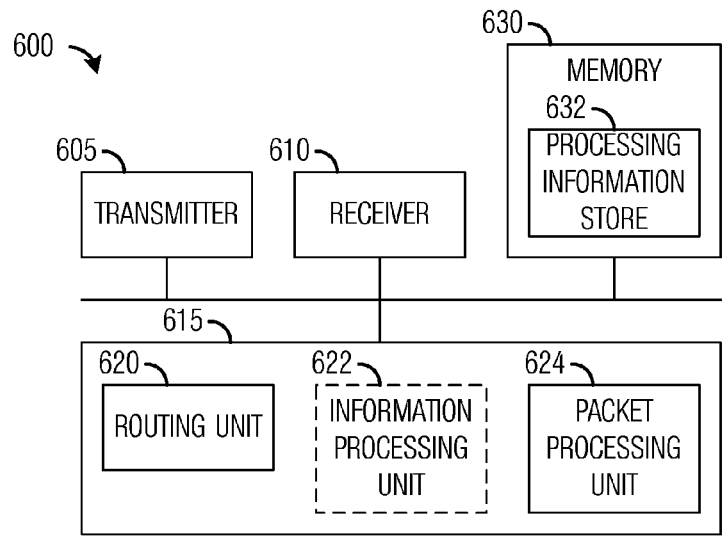
FIG. 6 illustrates an example device according to example embodiments described herein.

FIG. 6 provides an illustration of a device 600. Device 600 may be an implementation of an eBS or a eGW that supports local processing of M2M traffic. Device 600 may be used to implement various ones of the embodiments discussed herein. As shown in FIG. 6, a transmitter 605 is configured to send packets and a receiver 610 is configured to receive packets. Transmitter 605 and receiver 610 may have a wireless interface, a wireline interface, or a combination thereof.

A routing unit 620 is configured to routing packets based on identification information of the packet. Routing unit 620 switch the packets between local destinations, local processors, and/or remote processors based on the identification. An information processing unit 622 is configured to provide local processing for packets that are to be locally processed. Local processing includes information aggregation, information processing, and so forth. Information processing unit 622 may be an optional unit depending on the configuration of device 600. As an example, information processing unit 622 may be implemented as an external unit that is coupled to device 600 rather than being located in device 600. Information processing unit 622 may be co-located with device 600 or information processing unit 622 and device 600 may be in separate units.

A packet processing unit 624 is configured to determine identification information, such as an indicator, identifier, tag, or so on, in the packets. Packet processing unit 624 is configured to identify the identification information using techniques such as DPI, searching, or so forth. Packet processing unit 624 is further configured to determine if local processing is to be performed for a packet based on the identification information of the packet. A memory 630 is configured to store processing information for the packets based on the identification information, and so forth. For example, processing information may include information related to whether or not packets with certain identification information should be processed locally or remotely, and so on. Memory 630 arranges the processing information in a table that is indexed by the identification information. The processing information may be stored in a processing information store 632.

The elements of device 600 may be implemented as specific hardware logic blocks. In an alternative, the elements of device 600 may be implemented as software executing in a processor, controller, application specific integrated circuit, or so on. In yet another alternative, the elements of device 600 may be implemented as a combination of software and/or hardware.

As an example, transmitter 605 and receiver 610 may be implemented as a specific hardware block, while switching unit 620, information processing unit 622, and packet identification unit 624 may be software modules executing in a processor 615, a microprocessor, a custom circuit, or a custom compiled logic array of a field programmable logic array.

Figure 7A:
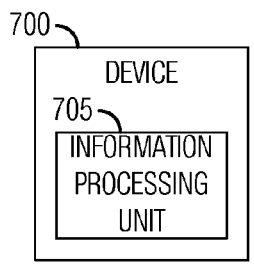
FIGS. 7a through 7c illustrate example diagrams of possible device and information processing unit configurations according to example embodiments described herein.
Figure 7B:
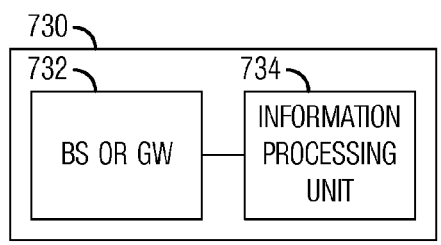
Figure 7C:
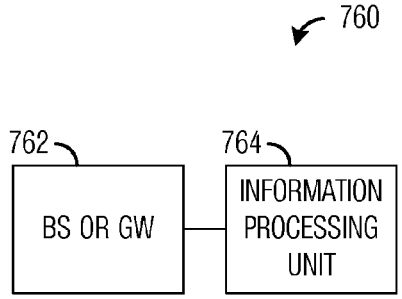

FIGS. 7a through 7c illustrate diagrams of possible device and information processing unit configurations. FIG. 7a illustrates a diagram of a device 700 wherein device 700 includes an information processing unit 705. FIG. 7b illustrates a diagram of a device 730 wherein device 730 includes a communications device (e.g., a BS or a GW) 732 co-located with an information processing unit 734. FIG. 7c illustrates a diagram of a device 760 comprising a communications device (e.g., a BS or a GW) 762 coupled to an information processing unit 764.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for packet processing, the method comprising:
receiving, at a communications node, a packet comprising machine-to-machine data from a machine-to-machine device, the packet specifying an address of a remote machine-to-machine hardware processor as a destination address of the packet;
determining, at the communication node, whether to process the machine-to-machine data locally or remotely according to identification information, wherein determining whether to process the machine-to-machine data locally or remotely comprises deciding to partially process the machine-to-machine data carried in the packet locally to reduce a traffic size associated with the machine-to-machine data;
partially processing the machine-to-machine data to obtain modified machine-to-machine data upon deciding to partially process the machine-to-machine data carried in the packet locally, the modified machine-to-machine data including fewer bits than the machine-to-machine data; and
routing the modified machine-to-machine data to the remote machine-to-machine hardware processor for further processing.

2. The method of claim 1, wherein partially processing the machine-to-machine data comprises one of the following: aggregating information in the packet, and analyzing the information in the packet.

3. The method of claim 1, further comprising identifying the identification information by searching for the identification information in the packet.

4. The method of claim 1, further comprising identifying the identification information by performing deep packet inspection on the packet.

5. The method of claim 1, wherein the identification information comprises an indicator of a hardware processor to process the information, an indicator of a type of processing, an identifier of the hardware processor of the packet, a tag to identify a type of the packet, an intended destination address of the packet, or a combination of any one or more of the foregoing.

6. The method of claim 1, further comprising determining an address of a local hardware processor to partially process the machine-to-machine data, wherein determining the address of the local hardware processor comprises:
referencing an information store with an intended destination address of the packet;
retrieving a corresponding switching address from the information store; and
identifying the corresponding switching address is the address of the local hardware processor.

7. A network entity comprising:
at least one hardware processor; and
a computer readable storage medium storing programming for execution by the at least one hardware processor, the programming includes instructions to:
receive a packet comprising machine-to-machine data from a machine-to-machine device, the packet specifying an address of a remote machine-to-machine hardware processor as a destination address of the packet;
determine whether to process the machine-to-machine data locally or remotely according to identification information in the packet, wherein the instructions to determine whether to process the machine-to-machine data locally or remotely include instructions to decide to partially process the machine-to-machine data carried in the packet locally to reduce a traffic size associated with the machine-to-machine data;
partially process the machine-to-machine data to obtain modified machine-to-machine data upon deciding to partially process the machine-to-machine data carried in the packet locally, the modified machine-to-machine data including fewer bits than the machine-to-machine data; and
route the modified machine-to-machine data to the remote machine-to-machine hardware processor for further processing.

8. The network entity of claim 7, wherein the programming includes further instructions to identify the identification information by searching the packet.

9. The network entity of claim 7, wherein the identification information comprises an intended destination address of the packet, and wherein the programming includes further instructions to determine an address of a local hardware processor for partially processing the machine-to-machine data according to the intended destination address upon deciding to partially process the machine-to-machine data locally.

10. The network entity of claim 9, wherein the programming includes further instructions to reference an information store with the intended destination address, retrieve a corresponding switching address from the information store, and set the corresponding switching address as the address of the local hardware processor.

11. The network entity of claim 7, wherein the instructions to partially process the packet comprises instructions to aggregate information in the packet.

12. The network entity of claim 7, wherein the instructions to partially process the packet comprises instructions to analyze the machine-to-machine information in the packet.

13. The network entity of claim 7, wherein the programming includes further instructions to identify the identification information by performing deep packet inspection on the packet.

14. A communications system comprising:
a machine-to-machine device comprising a hardware processor configured to transmit a packet comprising machine-to-machine data, the packet specifying an address of a remote machine-to-machine hardware processor as a destination address of the packet;
a communications node configured to:
receive the packet comprising machine-to-machine data;
decide to partially process the machine-to-machine data carried in the packet locally to reduce a traffic size associated with the machine-to-machine data;
partially process the machine-to-machine data to obtain modified machine-to-machine data upon deciding to partially process the machine-to-machine data carried in the packet locally, the modified machine-to-machine data including fewer bits than the machine-to-machine data; and
route the modified machine-to-machine data to the remote machine-to-machine hardware processor for further processing.

15. The communications system of claim 14, wherein the communications node is further configured to process the packet upon determining to process the packet locally.

16. The communications system of claim 14, wherein the communications system comprises a gateway router, and wherein the communications node comprises the communications controller, the communications controller being coupled to the machine-to-machine device and to the gateway router.

* * * * *